(12) United States Patent
Presley

(10) Patent No.: US 10,252,680 B2
(45) Date of Patent: Apr. 9, 2019

(54) ARTICULATING CARGO MANAGEMENT AND RACK SYSTEM

(71) Applicant: JAC Products, Inc., Saline, MI (US)

(72) Inventor: Michael J. Presley, Plymouth, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 15/949,788

(22) Filed: Apr. 10, 2018

(65) Prior Publication Data

US 2018/0290600 A1 Oct. 11, 2018

Related U.S. Application Data

(60) Provisional application No. 62/483,616, filed on Apr. 10, 2017.

(51) Int. Cl.
*B60R 9/06* (2006.01)

(52) U.S. Cl.
CPC ...................................... *B60R 9/06* (2013.01)

(58) Field of Classification Search
CPC .. B60R 9/06; B60R 9/00; B60R 9/042; B60R 9/045; B60R 2011/0084; B60R 2011/0085; B60P 7/14
See application file for complete search history.

(56) References Cited

U.S. PATENT DOCUMENTS

| | | | |
|---|---|---|---|
| 4,955,771 A | 9/1990 | Bott | |
| 5,443,190 A | 8/1995 | Cucheran et al. | |
| 6,206,624 B1 * | 3/2001 | Brandenburg | B60P 7/14 |
| | | | 410/121 |
| 6,467,663 B1 | 10/2002 | Kmita et al. | |
| 6,540,123 B1 * | 4/2003 | Kmita | B60P 3/40 |
| | | | 224/403 |
| 6,971,828 B2 | 12/2005 | Bernardo | |
| 7,273,336 B2 * | 9/2007 | Silamianos | B60P 7/14 |
| | | | 410/129 |
| 7,828,356 B2 * | 11/2010 | Wood | B62D 33/027 |
| | | | 296/26.08 |
| 7,878,743 B2 | 2/2011 | Aftanas | |
| 8,016,528 B2 * | 9/2011 | Kmita | B60P 7/14 |
| | | | 410/129 |
| 8,100,615 B1 * | 1/2012 | Freeborn | B60P 7/14 |
| | | | 410/130 |
| 8,348,331 B2 | 1/2013 | Holt | |

(Continued)

*Primary Examiner* — Corey N Skurdal
(74) *Attorney, Agent, or Firm* — Harness, Dickey & Pierce, P.L.C.

(57) ABSTRACT

In one aspect the present disclosure relates to a cargo management system for use in a cargo area of a vehicle. The system may use a track secured to a wall of the cargo area. An articulating system is secured to the track and adjustably positionable at a plurality of positions along the track. The articulating system includes a mounting panel adapted to be secured to the track, at least a first frame section, and a first articulating hinge system for supporting the first frame section for movement on the mounting plate. The first articulating hinge system has a first actuating element normally held in a locked orientation to hold the first frame section stationary, and movable into an unlocked position by a rotational force applied by a user, to enable the first articulating hinge system to be rotated on the mounting plate into a new orientation, and then held in the new orientation when the first actuating element is released by the user.

20 Claims, 18 Drawing Sheets

(56) References Cited

U.S. PATENT DOCUMENTS

| | | |
|---|---|---|
| 9,352,641 B2 | 5/2016 | Chapman et al. |
| 2006/0244279 A1 | 11/2006 | Ranka et al. |
| 2006/0279099 A1 | 12/2006 | Ranka et al. |
| 2007/0286697 A1 | 12/2007 | Kmita et al. |
| 2015/0175080 A1 | 6/2015 | Kmita et al. |
| 2017/0050579 A1 | 2/2017 | Ranka et al. |

* cited by examiner

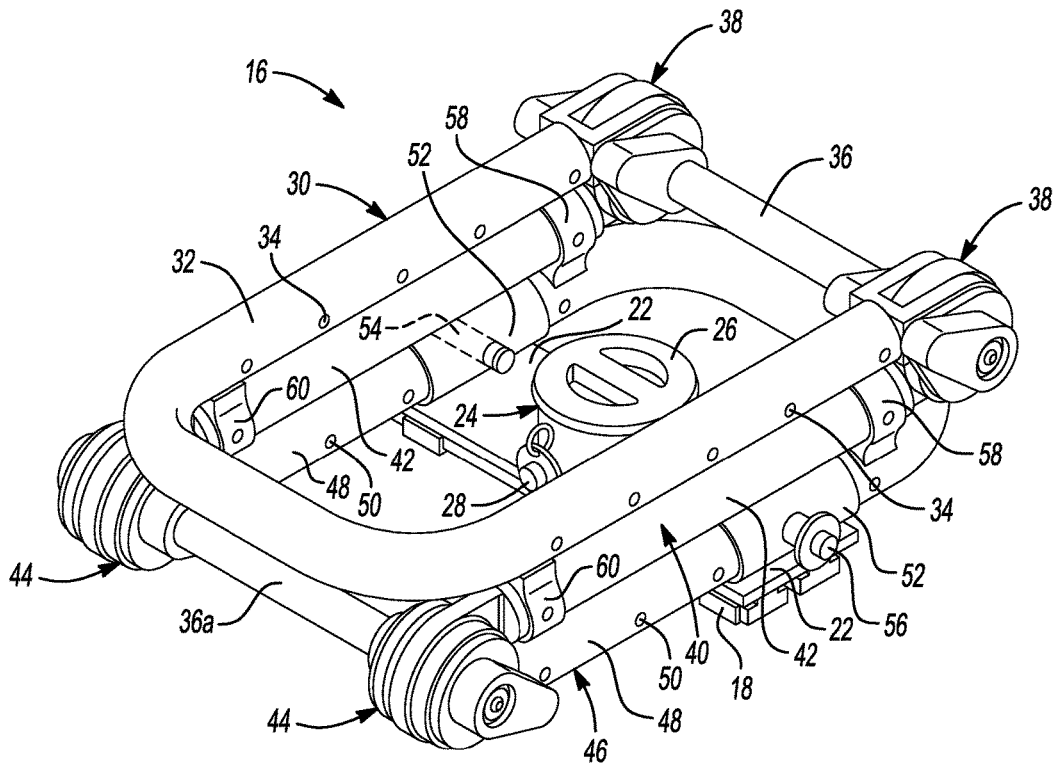
FIGURE 2
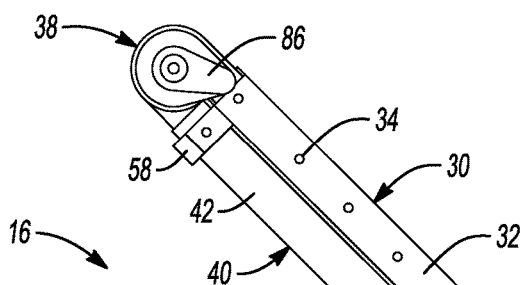
FIGURE 3
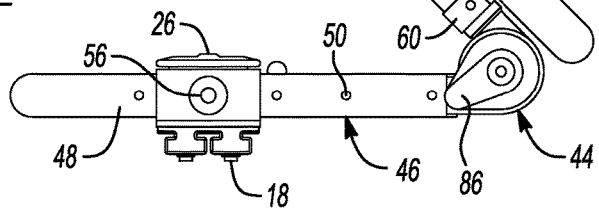

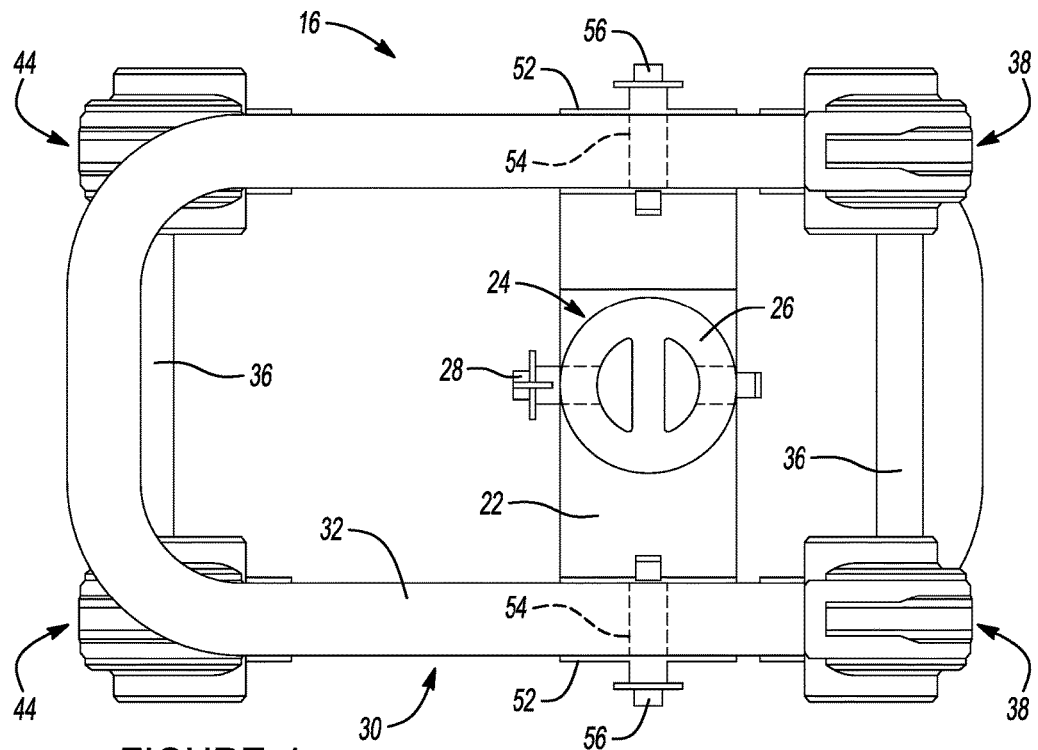
FIGURE 4
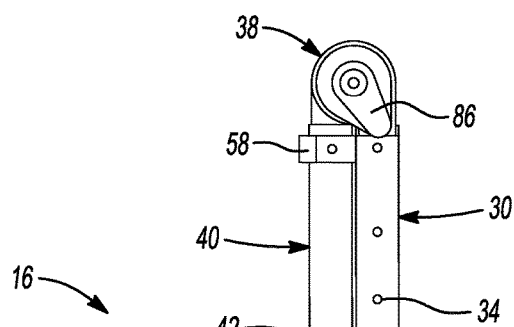
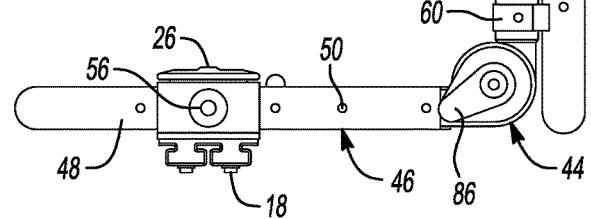
FIGURE 5

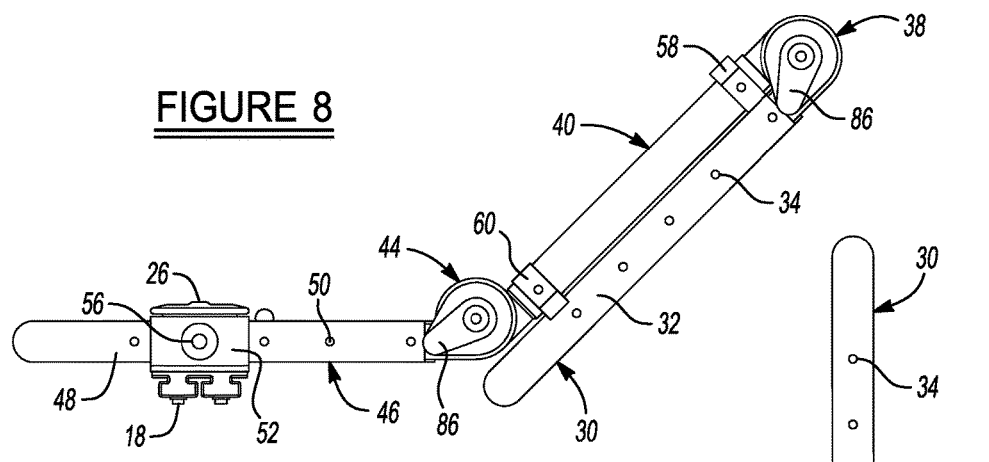
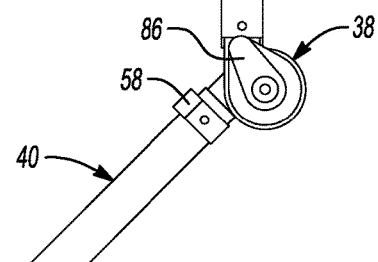
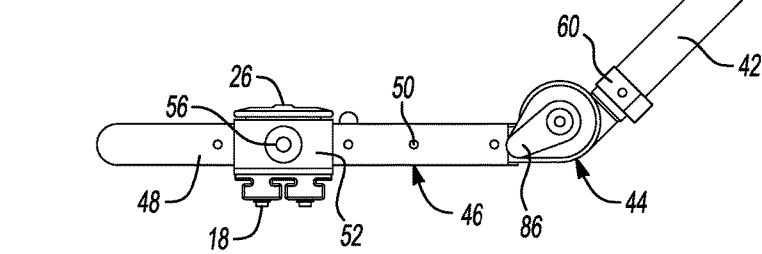

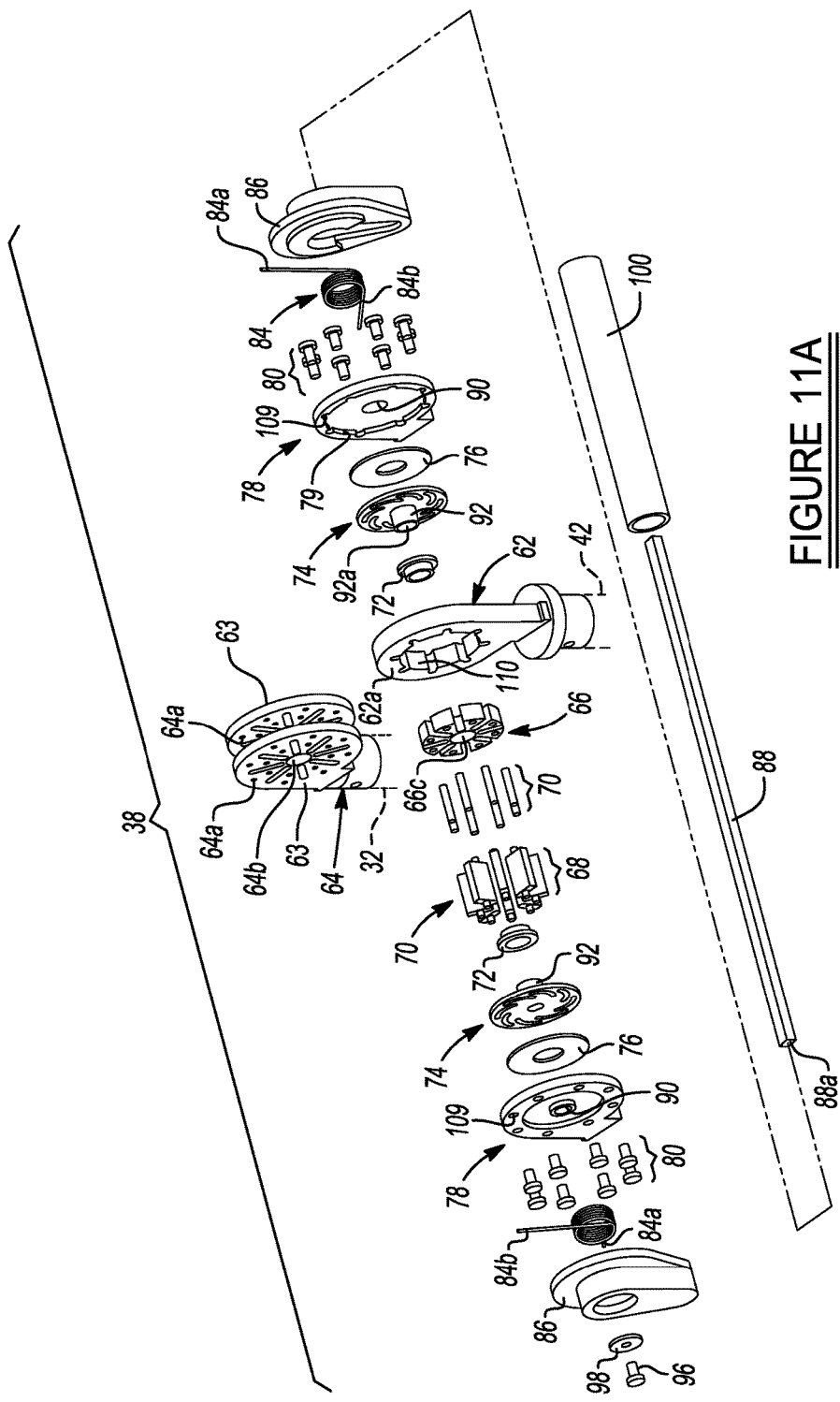

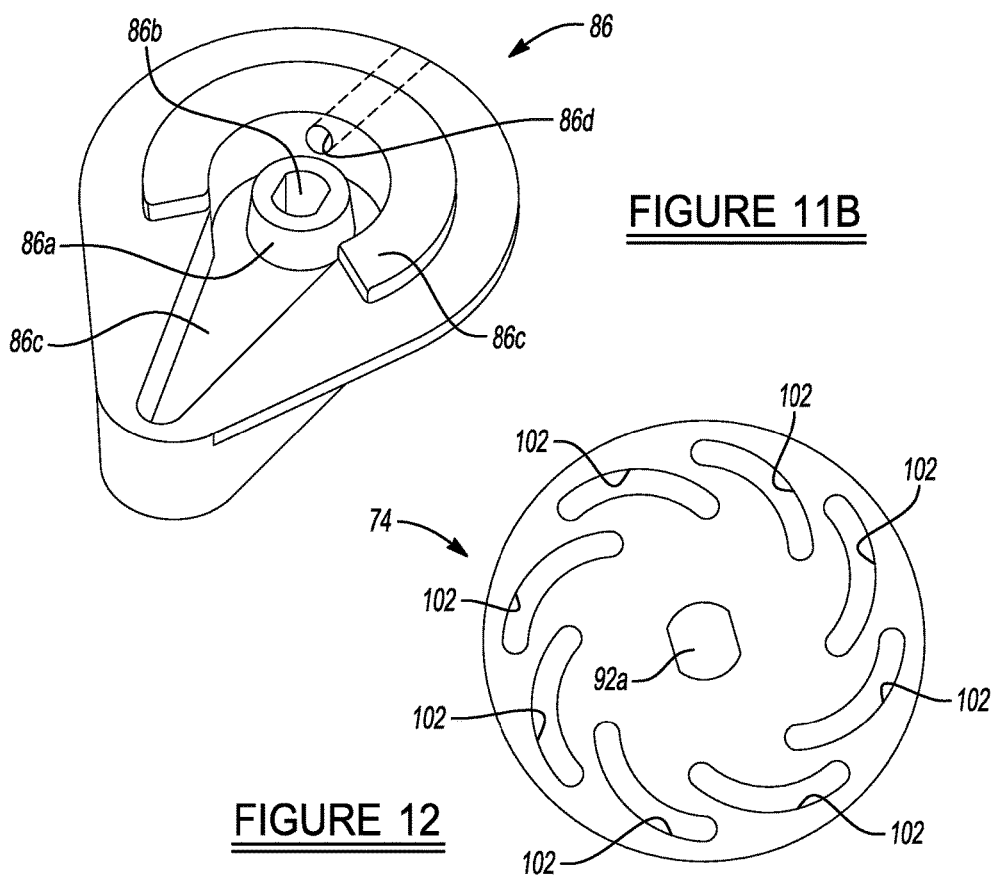
FIGURE 11B
FIGURE 12
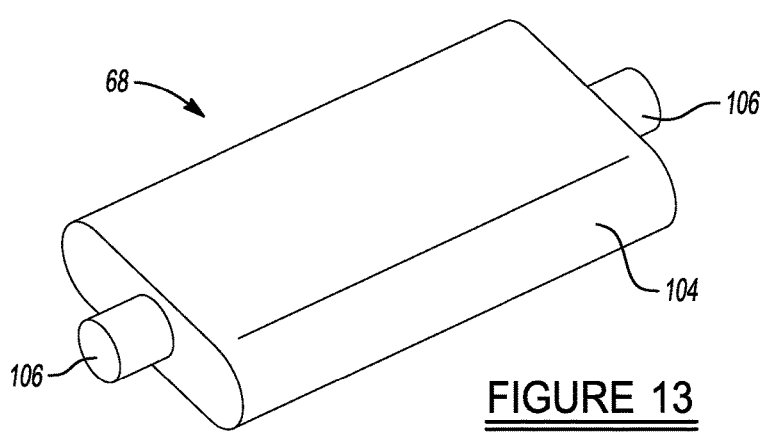
FIGURE 13

ARTICULATING CARGO MANAGEMENT AND RACK SYSTEM

CROSS-REFERENCE TO RELATED APPLICATIONS

This application claims the benefit of U.S. Provisional Application No. 62/483,616, filed on Apr. 10, 2017. The entire disclosure of the above application is incorporated herein by reference.

FIELD

The present disclosure relates to cargo restraint and rack systems, and more particularly to an articulating cargo restraint and rack system for use within a cargo area of a motor vehicle.

BACKGROUND

The statements in this section merely provide background information related to the present disclosure and may not constitute prior art.

Often there is a need to restrain cargo items within a cargo area of a motor vehicle. The cargo area may be a rear area of a cabin of a van, mini-van, or even a truck bed of a pickup truck. Typically cargo restraining systems employ a pole or bar that may be extended between the sidewalls of the cargo area. However, such a system provides very limited functionality.

With the growing popularity of SUVs, vans, min-vans and especially pickup trucks, there is a growing interest in providing a cargo restraining system that is able to provide significantly increased flexibility and utility in both restraining articles within a bed, and also acting as a rack for supporting articles of widely varying shapes and sizes thereon.

SUMMARY

This section provides a general summary of the disclosure, and is not a comprehensive disclosure of its full scope or all of its features.

In one aspect the present disclosure relates to a cargo management system for use in a cargo area of a vehicle. The system may include a track secured to a wall of the cargo area of the vehicle. An articulating system may be included which is secured to the track and adjustably positionable along the track so as to be securable at a plurality of positions along the track. The articulating system may include a mounting panel adapted to be secured to the track, at least a first frame section, and a first articulating hinge system for supporting the first frame section for movement relative to the mounting plate. The first articulating hinge system may have a first actuating element, the first actuating element and the first articulating hinge system normally being held in a locked orientation to hold the first frame section stationary. The first actuating element may be configured to be movable into an unlocked position by a rotational force applied by a user, which enables the first articulating hinge system to be articulated to permit the first frame section to be rotated relative to the mounting plate into a new orientation, and then held in the new orientation when the first actuating element is released by the user.

In another aspect the present disclosure relates to a cargo management system for use in a cargo area of a vehicle. The system may include a track secured to a wall of the cargo area of the vehicle. An articulating system may be included which is secured to the track and adjustably positionable along the track so as to be securable at a plurality of positions along the track. The articulating system may include a mounting panel adapted to be secured to the track, at least a first frame section, and a first articulating hinge system for supporting the first frame section for movement relative to the mounting plate, and having a rotationally movable first actuating element. A second frame section may also be included along with a second articulating hinge system for coupling the first and second frame sections for movement relative to each other. The second articulating hinge system may have a rotationally movable second actuating element. Each of the first and second actuating elements may be held in a normally locked orientation to hold the first frame section stationary relative to the second frame section. The first actuating element may be configured to be movable into an unlocked position by a rotational force applied by a user, which enables the first frame section to be articulated freely relative to the second frame section, and then held in a new angular orientation when the first actuating element is released by the user. The second actuating element may be configured to be movable into an unlocked position by rotational force applied by the user, which enables the second frame section to be articulated freely relative to the mounting plate while the second actuating element is being held in the unlocked position and then held in a new angular orientation when the second actuating element is released by the user.

In still another aspect the present disclosure relates to a cargo management system for use in a cargo area of a vehicle. The system may include an articulating system adapted to be operatively supported from a wall of the cargo area. The articulating system may include a mounting panel adapted to be operatively secured to the wall, at least a first frame section, and a first articulating hinge system for supporting the first frame section for movement relative to the mounting plate. The first articulating hinge system may have a first actuating element, the first actuating element and the first articulating hinge system normally held in a locked orientation to hold the first frame section stationary. The first actuating element may be configured to be movable into an unlocked position by a rotational force applied by a user, which enables the first articulating hinge system to be articulated to permit the first frame section to be rotated relative to the mounting plate into a new orientation while the first actuating element is being held in the unlocked position, and then held stationary in the new orientation when the first actuating element is released by the user.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is an enlarged perspective view of one of the articulating subsystems secured to a portion of its associated track;

FIG. 3 is a side elevational view showing one of the articulating subsystems in a partially collapsed (i.e., stowed) configuration;

FIG. 4 is a plan view of the articulating subsystem of FIG. 2;

FIG. 5 is another side elevational view of the articulating subsystem of FIG. 3 manipulated into a different configuration;

FIG. 8 is a plan view of the articulating subsystem of FIG. 2 manipulated into yet another configuration;

FIG. 9 is a plan view of the articulating subsystem of FIG. 2 manipulated into a somewhat V-shaped configuration;

FIG. 10 is a plan view of the articulating subsystem of FIG. 2 configured in another orientation;

FIG. 11A-11B is an exploded perspective view of the components associated with one of the articulating hinge subsystems used on the articulating subsystem shown in FIG. 2;

FIG. 12 is an enlarged plan view of a guide element of the assembly of FIG. 11A-11B;

FIG. 13 is a plan view of one of the locking pawls of the assembly of FIG. 11A-11B;

DETAILED DESCRIPTION

Figure 1:
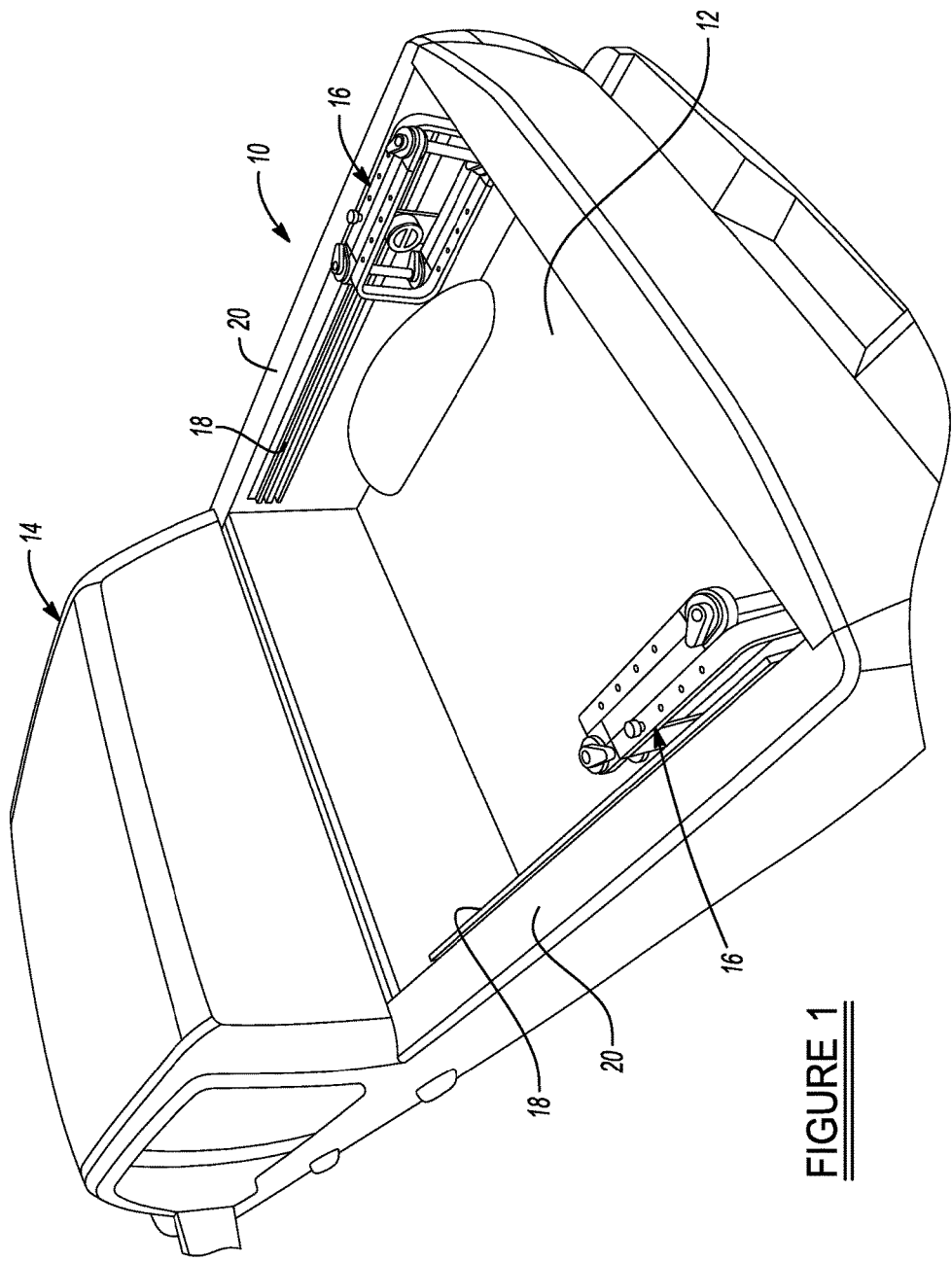
FIG. 1 is a perspective view of one embodiment of an articulating cargo management and rack system in accordance with the present disclosure showing a pair of articulating subsystems of the system being used in a bed of a pickup truck.
Figure 6:
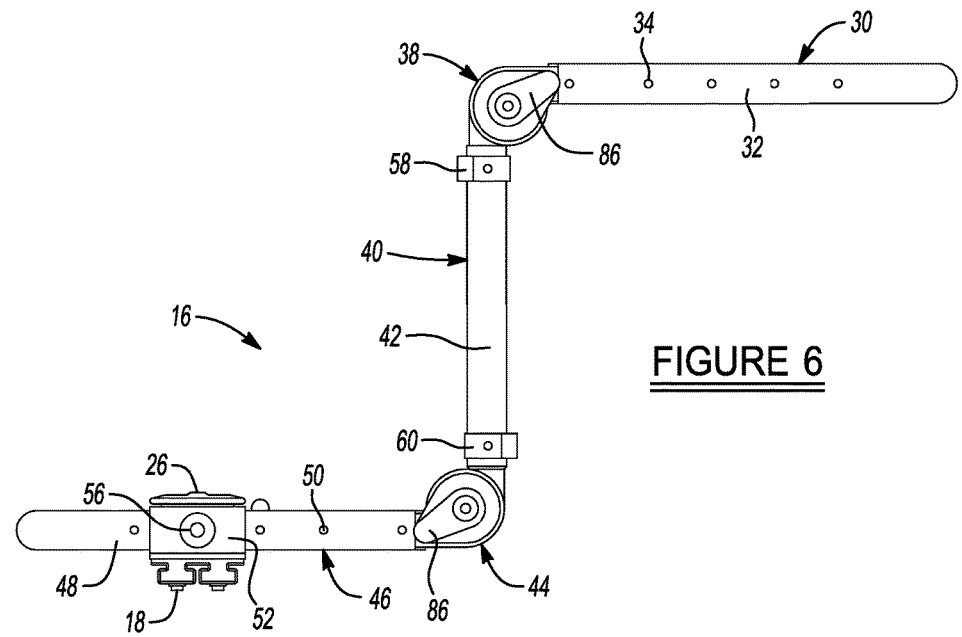
FIG. 6 is a side elevational view of the articulating subsystem of FIG. 2 manipulated into another position having an S-shape.
Figure 7:
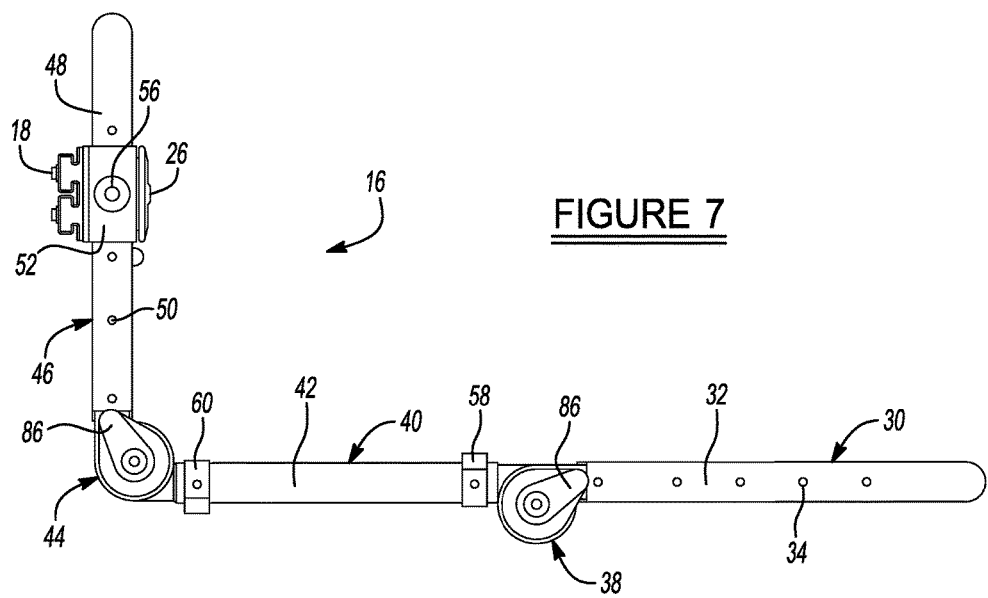
FIG. 7 is a plan view of the articulating subsystem of FIG. 2 manipulated into yet another configuration having an L-shape.

The following description is merely exemplary in nature and is not intended to limit the present disclosure, application, or uses. It should be understood that throughout the drawings, corresponding reference numerals indicate like or corresponding parts and features.

Referring to FIG. 1 one embodiment of a system 10 in accordance with the present disclosure is shown. In this example the system 10 is employed in a bed 12 of a pickup truck 14. The system 10 in this example includes a pair of articulating restraining/rack subsystems 16 (hereinafter simply "articulating subsystems 16") that are supported from tracks 18 fixedly mounted on inside portions of sidewalls 20 of the bed 12. And while two articulating subsystems 16 are shown, it will be appreciated that a greater or lesser plurality of the articulating subsystems 16 may be used to form the system 10. It will also be appreciated that the system 10 may be employed in a cargo area of a van, mini-van, SUV, or possibly even other types of cargo areas, such as within an interior area of a railway car, a ship, an aircraft, etc. Accordingly, the system 10 is not limited to use with any one type of vehicle. It is also expected that the system 10 may find utility in fixed locations such as within storage containers, garages, warehouses, etc.

FIG. 1 shows the articulating subsystems 16 in their stowed orientations. The articulating subsystems 16 are independently movable and positionable along their associated tracks 18. Each articulating subsystem 16 may be articulated into a wide number of positions and orientations to best accommodate supporting and/or restraining articles of widely varying shapes and sizes. When folded into their stowed orientations as shown in FIG. 1, the articulating subsystems 16 take up only minimal room in the bed 12, thus leaving the bed free for carrying larger cargo items. The articulating subsystems 16 form lightweight assemblies that can also be released from their tracks 18, as will be described in the following paragraphs, and completely removed from the bed 12 within seconds by a single individual, and without the use of any external tools.

Referring to FIGS. 2 and 3, one of the articulating subsystems 16 is shown in greater detail secured to just a short portion of its associated track 18. The articulating subsystem 16 may include a mounting panel 22 adapted to engage with the track 18 and to be moved slidably along the track. A locking assembly 24 on the mounting panel 22 enables the articulating subsystem 16 to be secured at any one of a plurality of spaced apart holes 18a in the track 18, thus allowing a wide degree of longitudinal positioning of the articulating subsystem within the bed 12. The locking assembly 24 includes a manually graspable actuator element 26 which may be grasped with the fingers of one hand and pulled outwardly, releasing a locking pin (not visible) from one of the holes 18a, and allowing the articulating subsystem to be slid along its track 18. A removable locking pin 28 extends through a portion of the locking assembly 24 and allows the articulating subsystem 16 to be rotated and placed in either a vertical orientation (such as shown in FIG. 1) or a horizontal orientation, when removed, and locked into the chosen position once reinserted as shown in FIG. 2.

The articulating subsystem 16 also includes a U-shaped first frame section 30 having parallel, spaced apart tubular elements 32 each having a plurality of spaced apart and laterally aligned holes 34. A first connecting member 36 and a pair of first articulating hinge subsystems 38 couple first frame section 30 to a second frame section 40. Second frame section 40 includes a pair of parallel arranged tubular members 42 each coupled at one end to one respective hinge subsystem 38, and at opposite ends to second articulating hinge subsystems 44 (hereinafter "second hinge subsystems 44"). The second articulating hinge subsystems 44 are coupled by a connecting member 36a. A third generally U-shaped frame section 46 is coupled at its distal ends to the second hinge subsystems 44. In this example the first and second hinge subsystems 38 and 44 are identical in construction, but need not necessarily be identical.

With further reference to FIGS. 2 and 4, the third frame section 46 may include parallel tubular members 48 each having a plurality of laterally aligned, and longitudinally spaced, holes 50. Two of sleeve sections 52 are fixedly secured to the mounting panel 22. The sleeve sections 52 receive the tubular members 48 and each also includes holes 54 through which separate locking pins 56 may be inserted. The locking pins 56 may be the "quick-release" style of locking pins that are widely commercially available, and which incorporate spring loaded retaining balls that retract during installation as the shaft of the locking pin is pushed through a suitably sized bore or hole, and then pop out to lock the pin in place as the balls clear the hole or bore. The locking pins 56 and the holes 54 enable the third frame section 46 to be adjusted relative to track 18. This allows a significant degree of quick and easy adjustability in the overall vertical and/or horizontal placements of the articulating subsystems 16. The tubular members 42 may also each include cradle members 58 and 60 to support the first and third frame sections 30 and 46 when the system 10 is in its fully collapsed configuration as shown in FIG. 2.

Figure 28:
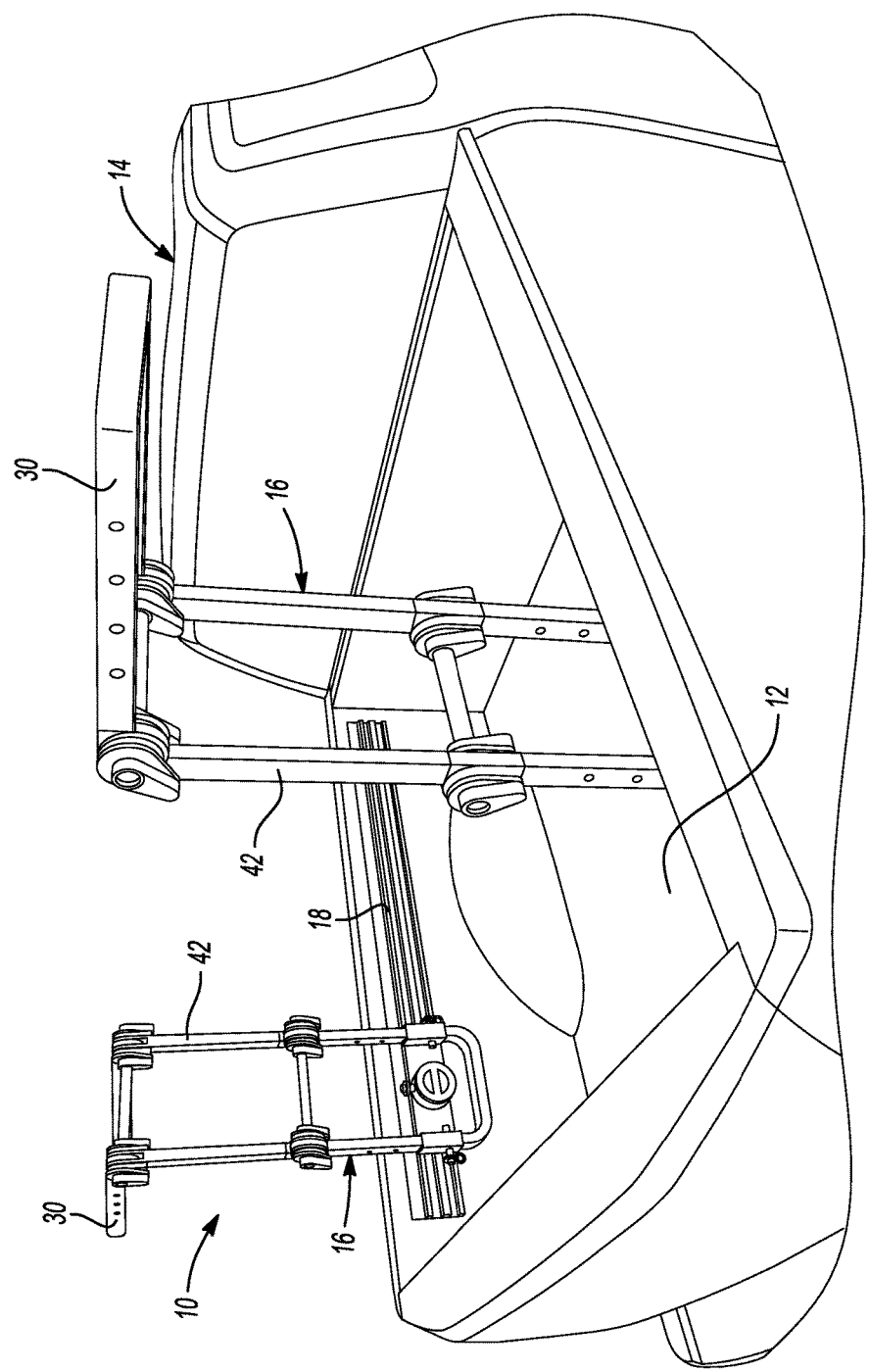
FIG. 28 is a perspective view showing the articulating subsystems being used to form elevated supporting structures.

As shown in FIGS. 3-10 and 28, the articulating subsystem 16 can be manipulated into a wide variety of configurations to optimally suit restraining or supporting different sized articles. The system 10 is equally well suited to supporting articles thereon as it is restraining articles being carried in the bed 12. The articulating subsystems 16 can be placed on the same track 18 and used to support longer items (e.g., ladder, kayak, boards, electrical and plumbing conduit, etc.) above the bed 12 floor. If four articulating subsystems 16 are employed in this fashion, that is two per track 18, then a substantially complete upper shelf may be formed above the bed 12 floor, thus leaving the floor open for use in carrying smaller cargo items. FIG. 28 illustrates that the articulating subsystems 16 can be configured to extend outwardly over the side of the bed 12. This is useful for supporting a light (not shown), camera, etc. which is removably attached to the articulating subsystem 16.

Referring to FIG. 11A, one of the first hinge subsystems 38 is shown. As noted above, hinge subsystems 38 and 44 are identical in construction, so only hinge subsystem 38 will be described in detail. The hinge subsystems 38 and 44 form locking mechanisms that allow system 10 to be held in various desired configurations, and easily unlocked to be repositioned in a different configuration when needed. The hinge subsystems 38 and 44 require no external tools or disassembly procedures to be reconfigured in a different configuration.

The articulating hinge subsystem 38 shown in FIG. 11A includes first and second housing portions 62 and 64, respectively. The first housing portion 62 is fixedly secured to one of the tubular members 42 and the second housing portion 64 is secured to one distal end of the U-shaped frame section 30. The second housing portion 64 is formed somewhat similar to a clevis having disc-like portions 63 arranged parallel to one another with a spacing therebetween. The spacing is just sufficient to accommodate and allow free rotation of a head portion 62a of the first housing portion 62. A guide element 66 is disposed within a circular opening 62b in the head portion 62a of the first housing portion 62. With brief reference to FIG. 18, the guide element 66 can be seen to include a plurality of radially extending slots 66a, a plurality of bores 66b and a circular center bore 66c, the purpose of which will be explained momentarily.

Figure 15:
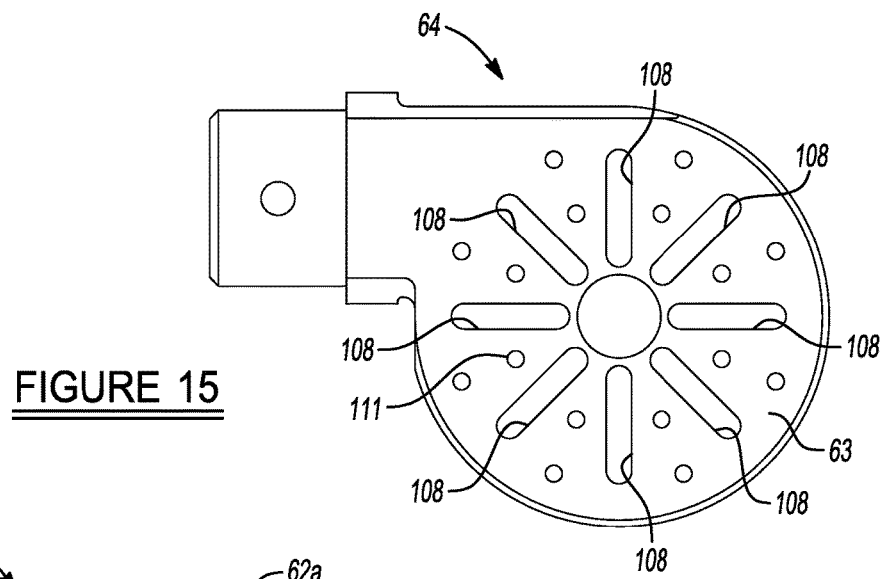
FIG. 15 is a plan view of the second housing portion 64 of the assembly of FIG. 11A-11B.
Figure 18:
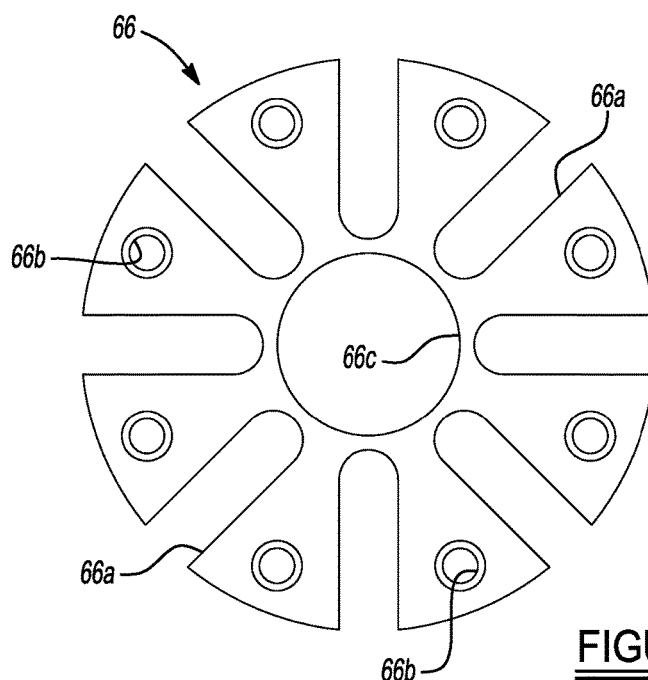
FIG. 18 is a plan view of a guide element of the assembly shown in FIG. 11A-11B.

With reference to FIGS. 11A, 15 and 18, the hinge subsystem 38 may also include a plurality of rectangular locking pawls 68 and a plurality of roll pins 70. The locking pawls 68 have a width such that they may be fully retracted into the radially extending slots 66a of the guide element 66 when the hinge subsystem 38 is in its unlocked orientation. The locking pawls 68 are also positioned to extend through portions of the second housing portion 64. Guide bushings 72 are positioned on opposing sides of the second housing portion 62. Guide elements 74 are positioned over the guide bushings 72. Washers 76 are positioned over outwardly facing sides of the guide elements 74 and enclosed by two identical housing components 78. The roll pins 70 extend through the bores 66b in the guide element 66 (FIG. 18) through holes 111 in each of the disc-like portions 63 of the second housing portion 64 to hold the guide element 66 stationary within the hinge subsystem 38. Pluralities of threaded screws 80 extend through openings 109 (FIG. 11A) in each housing component 78 and into threaded holes 64a in the disc-like portions 63 of the second housing portion 64.

Figure 17:
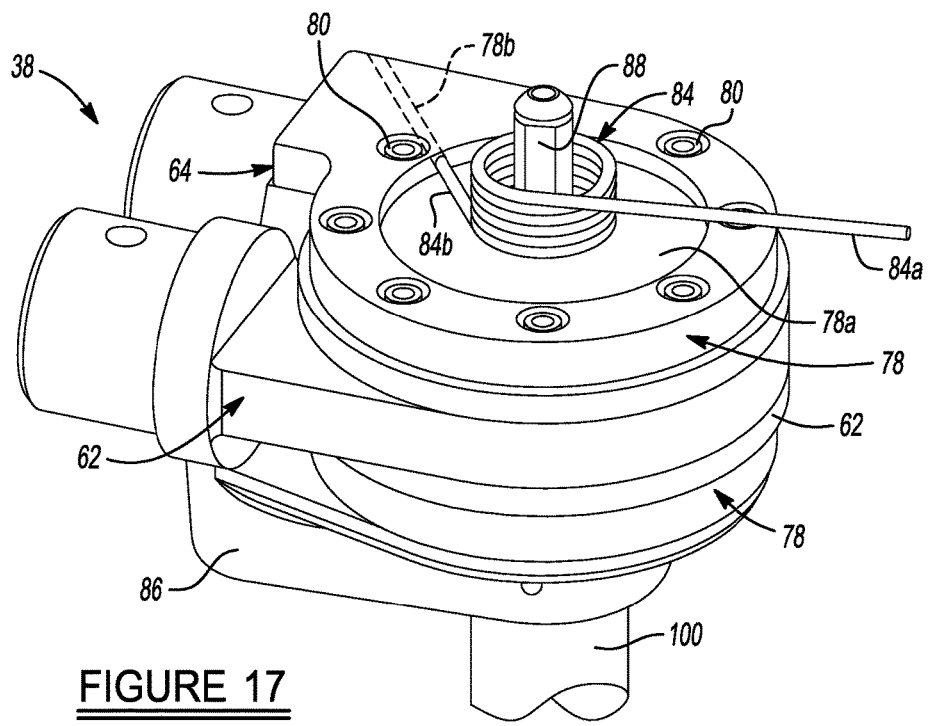
FIG. 17 is a perspective view of one of the articulating assemblies partially disassembled to illustrate the position of the torsion spring.

With further reference to FIGS. 11A, 11B and 17, the hinge subsystem 38 further includes two torsions springs 84 that are operably coupled to a pair of actuating levers 86. More particularly, each torsion spring 84 is positioned over a hub 86a (FIG. 11B) on an inside surface of its respective actuating lever 86, and within a recess 78a (FIG. 17) of its associated housing component 78, when assembled between its associated actuating lever and housing component. As shown in FIG. 11B, the hub 86a further has a through bore 86b. Each torsion spring 84 has a first leg 84a which is captured in an inner recessed surface 86c (FIG. 11B) of its associated actuating lever 86, and a second leg 84b which extends through a bore 78b (FIG. 17) of a respective one of the housing components 78. Arcuate boss portion 86c (FIG. 11B) projects partially into the recess 78a of the housing component 78 and helps to keep the actuating lever 86 centered relative to the housing component 78. A connecting rod 88 (FIG. 11A) having a generally circular cross sectional shape with one or more flat surfaces extends through an opening 90 in each of the housing components 78, through washers 76, through an opening 92a (also visible in FIG. 12) in a center hub 92 in each guide element 74, through a complementary shaped opening 66c in the guide element 66 (visible in FIG. 18 also), through openings 64b in the second housing portion 64, and its opposite ends are seated in the bore 86b in each actuating lever 86. In this regard it will be appreciated that the bore 86b (FIG. 11B) in each actuating lever 86 has a cross sectional configuration and dimensions that are complementary to the connecting rod 88 to enable the connecting rod 88 to be keyed to the actuating levers. The opening 92a in each guide element 74 is likewise keyed to the connecting rod 88. A threaded screw 96 (FIG. 11A) and washer 98 engage a threaded blind hole (not visible) in a distal end 88*a* of the connecting rod 88 to secure the various components of the hinge subsystem 38 together as an assembly on the distal end 88*a* of the connecting rod 88.

With the above described construction, rotating either of the actuating levers 86 causes a corresponding rotation of the connecting rod 88, both guide elements 74 and the other one of the actuating levers 86. The torsion springs 84 work cooperatively to bias the actuating levers 86 in the same rotational direction. A user may rotate either of the actuating levers 86*a* or 86*b* at either one of the hinge subsystem 38 to place both of the hinge subsystem 38 in the unlocked position, wherein the frame section 30 can be rotated freely. Releasing the actuating lever 86*a* or 86*b* causes the torsion springs 84 to bias the hinge subsystem 38 back into the locked orientation.

With further reference to FIG. 11B, each actuating lever 86 may include a threaded bore 86*d* for receiving a set screw (not shown). The set screw may be used to secure the actuating lever 86 to the connecting rod 88. Referring further to FIG. 11A, the connecting rod 88 may extend through a sleeve 100 which helps to set a desired spacing between the pair of hinge subsystems 38. The hinge subsystem 38 at the opposite end of the connecting rod 88 is not shown in FIG. 11A-11B, but would be assembled identically to that described above.

FIG. 12 shows an enlarged plan view of one of the guide elements 74. As noted above, the two guide elements 74 shown in FIG. 11A-11B are identical in construction but symmetrically opposite (mirrored). Each guide element 74 includes a plurality of arcuate, radially arranged slots 102. Each of the slots 102 are also angled relative to the center hub 92.

Figure 14:
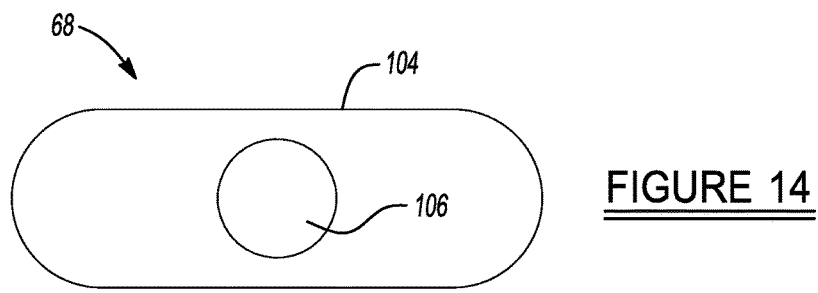
FIG. 14 is an end view of the locking pawl of FIG. 13.

FIGS. 13 and 14 show enlarged views of one of the locking pawls 68. Each locking pawl 68 may have a generally round or rectangular body portion 104. FIGS. 13 and 14 show the body portion 104 as being rectangular, but a round shape, or even other shapes could be used just as effectively. The body portion 104 has two longitudinally aligned circular tabs 106 projecting from opposite ends of the body portion 104. The diameter of the tabs 106 is such that each tab fits within an associated one of the slots 102 (FIG. 12) and is able to slide radially towards and away from the center hub 92 as the guide elements 74 are rotated in unison by movement of the connecting rod 88.

With reference to FIGS. 14 and 15, the second housing portion 64 (FIG. 14) has a plurality of radially arranged rectangular slots 108. The dimensions of each body portion 104 of each locking pawl 68 are such that the body portion 104 is able to slide a predetermined distance radially inwardly and outwardly, which places the hinge subsystem 38 in either an unlocked orientation or a locked orientation, as will be explained further in the following paragraphs.

Figure 16:
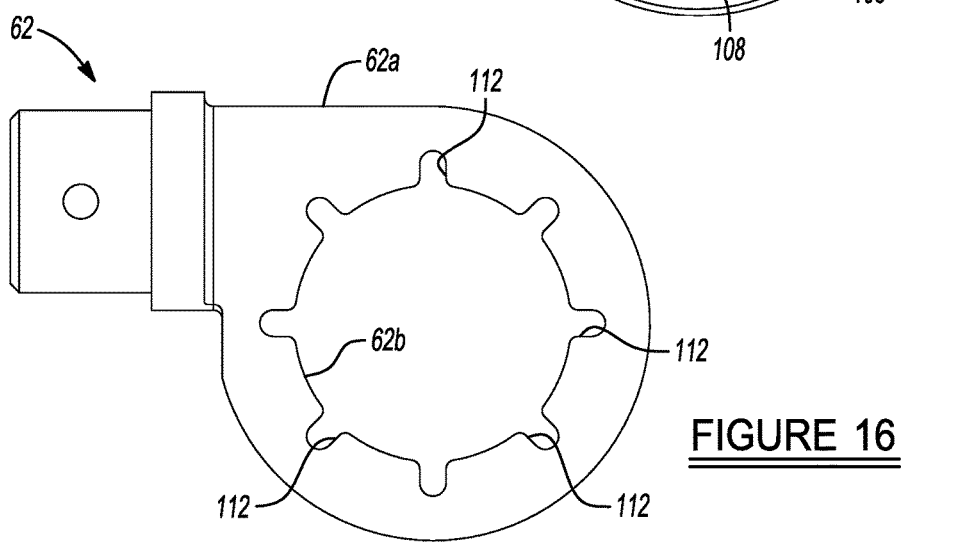
FIG. 16 is a plan view of the first housing portion of the assembly of FIG. 11A-11B.

With reference to FIG. 16, an enlarged plan view of the first housing portion 62 is shown. The head portion 62*a* of the first housing portion 62 includes the circular opening 62*b* which has a plurality of radially extending, semi-circular notches 112 arranged circumferentially there around. The notches 112 are shaped and dimensioned to be able to receive an edge of the body portion 104 of an associated one of the locking pawls 68 when the articulating hinge subsystem 38 is in a locked orientation. The locking pawls 68 may be dimensioned with a length such that when they are fully seated in an inward most radial position in the slots 108 of the second housing portion 64 (FIG. 11A-11B), they are completely clear of the semi-circular notches 112 in the first housing portion 62. This allows the first housing portion 62 to rotate freely relative to the second housing portion 64.

Conversely, when the articulating hinge subsystem 38 is in a locked orientation, all of the locking pawls 68 will be biased radially outwardly into their respective semi-circular notches 112, thus locking the first housing portion 62 against movement relative to the second housing portion 64. Thus, when in the locked orientation, the hinge subsystem 38 will hold the first frame section 30 in the position it is placed in relative to the second frame section 40. Likewise, the hinge subsystems 44 are constructed in the same manner and operate in the same manner to hold the third frame section 46 fixedly relative to the second frame section 40 when both hinge subsystems 44 are in their locked positions.

A user may rotate either of the actuating levers 86 or 86 at either one of the hinge subsystems 38 to simultaneously place both of the hinge subsystems 38 in the unlocked position, wherein the frame section 30 can be rotated freely. Releasing either actuating lever 86 causes the torsion springs 84 to bias the hinge subsystem 38 back into the locked orientation.

Figure 19:
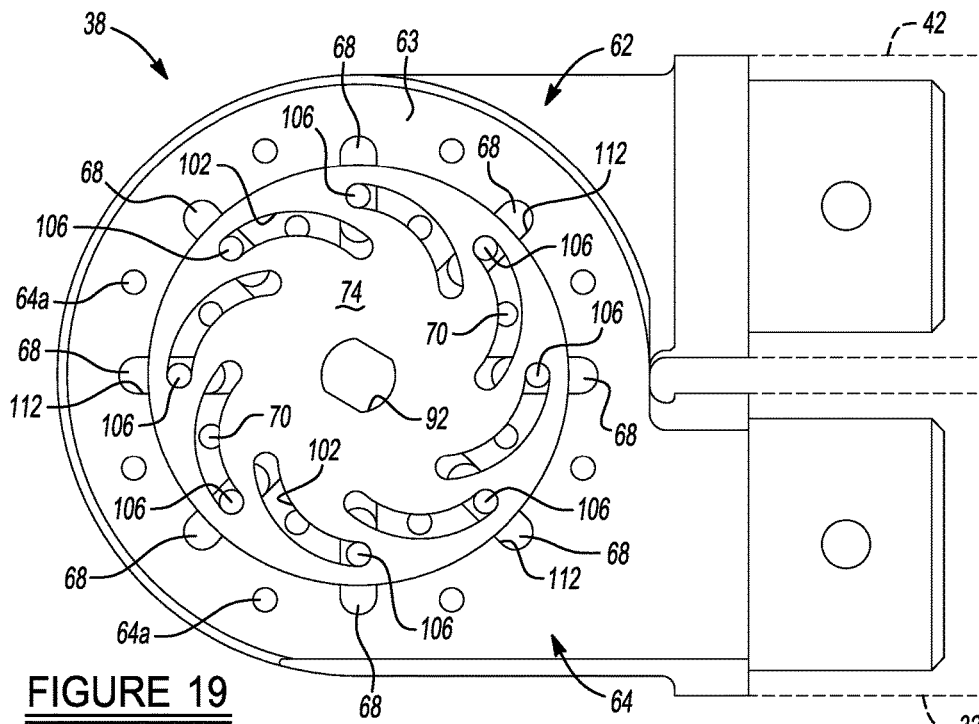
FIG. 19 is a plan view of a portion of the articulating hinge subsystem of FIG. 11A-11B showing the subsystem in a locked orientation.

Referring to FIG. 19, one of the hinge subsystems 38 is shown partially assembled to illustrate how the locking pawls 68 interact with various other components of the hinge subsystem. FIG. 19 shows the hinge subsystem 38 in a locked orientation. In the locked orientation the locking pawls 68 are positioned at their radially outwardmost positions engaging the semi-circular notches 112 in the first housing portion 62. This locks the first and second housing portions 62 and 64 together. The rotational biasing force provided by the torsion springs 84 cooperate to maintain both of the guide elements 74 in the orientation shown in FIG. 19, which maintains the locking pawls 68 in their radially outwardly biased orientations engaging the semi-circular notches 112. The opposing tabs 106 of each locking pawl 68 engage one extreme end of their respective slots 102 in each of the guide elements 74.

Figure 20:
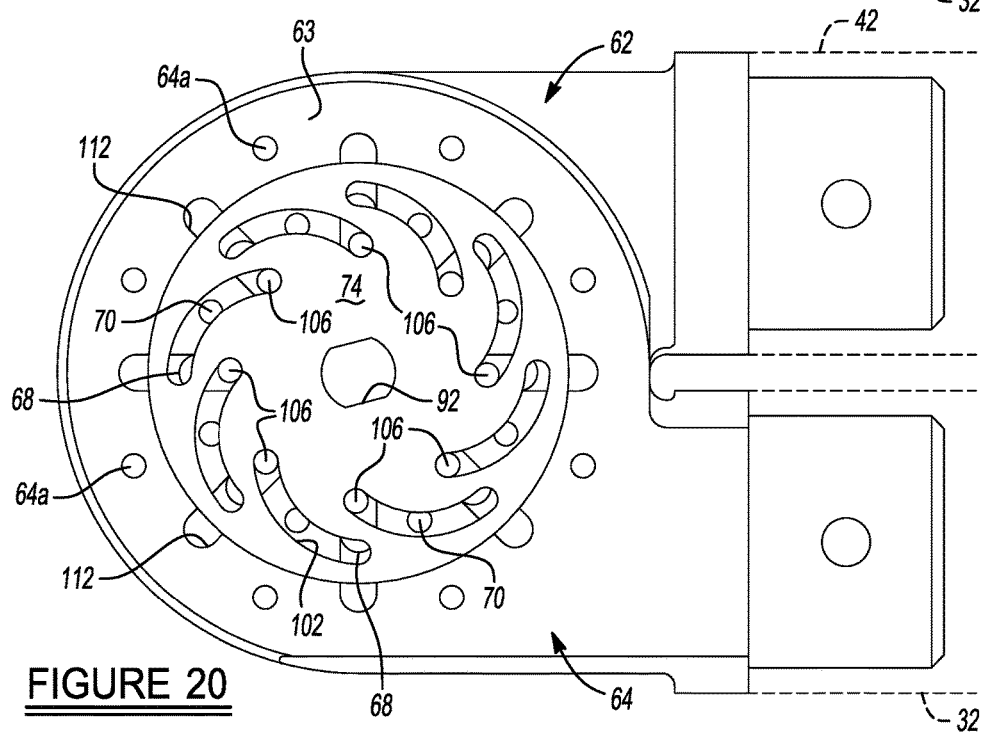
FIG. 20 is a plan view of the articulating hinge subsystem of FIG. 19 but showing the guide elements of the subsystem having been rotated into an unlocked position, thus causing radial inward retraction of all of the locking pawls.

FIG. 20 shows the hinge subsystem 38 of FIG. 19 in its unlocked orientation. It will be understood that to place the hinge subsystem 38 in the unlocked position, one of the actuating levers 86 (not shown in FIG. 20) will have been rotated into the unlocked position. This rotation of either one of the actuating levers 86 causes a corresponding rotation of both of the guide elements 74 in a counterclockwise direction when viewing FIG. 20. This counterclockwise rotation of the guide elements 74 causes each of the slots 102 in the guide elements to retract all of the locking pawls 68 radially inwardly, simultaneously, as each pair of opposing tabs 106 on each locking pawl 68 is forced to follow the path presented by the slot 102 of its associated guide element. While either one of the actuating levers 86 is held in the unlocked position, the first housing portion 62 can be rotated freely relative to the second housing portion 64. As soon as the actuating lever 86 is released, the biasing force from torsion springs 84 rotates the guide elements 74 in the clockwise direction, when viewing FIG. 20, and the locking pawls 68 will again be driven radially outwardly and biased into engagement with the semi-circular notches 112 in the first housing portion 62. In this regard it will be appreciated that if the semi-circular notches 112 are not perfectly radially aligned with the locking pawls 68 when the actuating lever(s) 86*a* or 86*b* is released, then some small amount of rotational adjustment of the first housing portion 62 relative to the second housing portion 64 may be required to effect the above-described locking engagement. But once aligned with the semi-circular notches 112, the locking pawls 68 will "snap" into the semi-circular notches 112, providing a tactile signal to the user that the hinge subsystem 38 is now in a locked orientation.

Figure 21A:
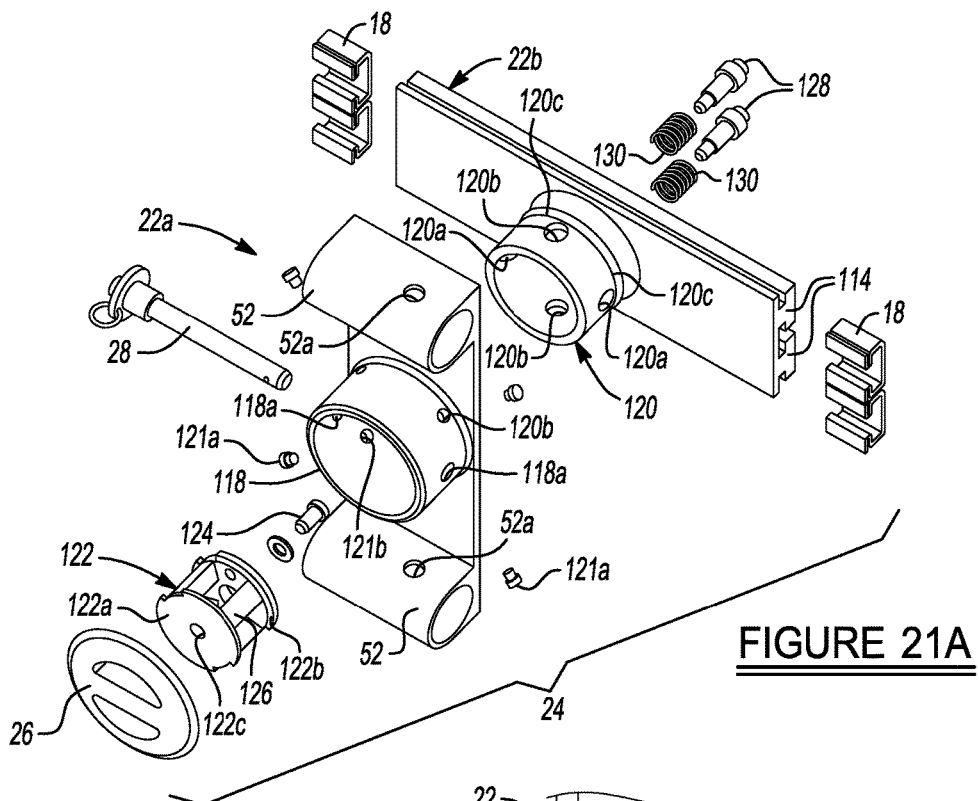
FIG. 21A is an exploded perspective view of the components of the locking assembly shown in FIG. 2.
Figure 21B:
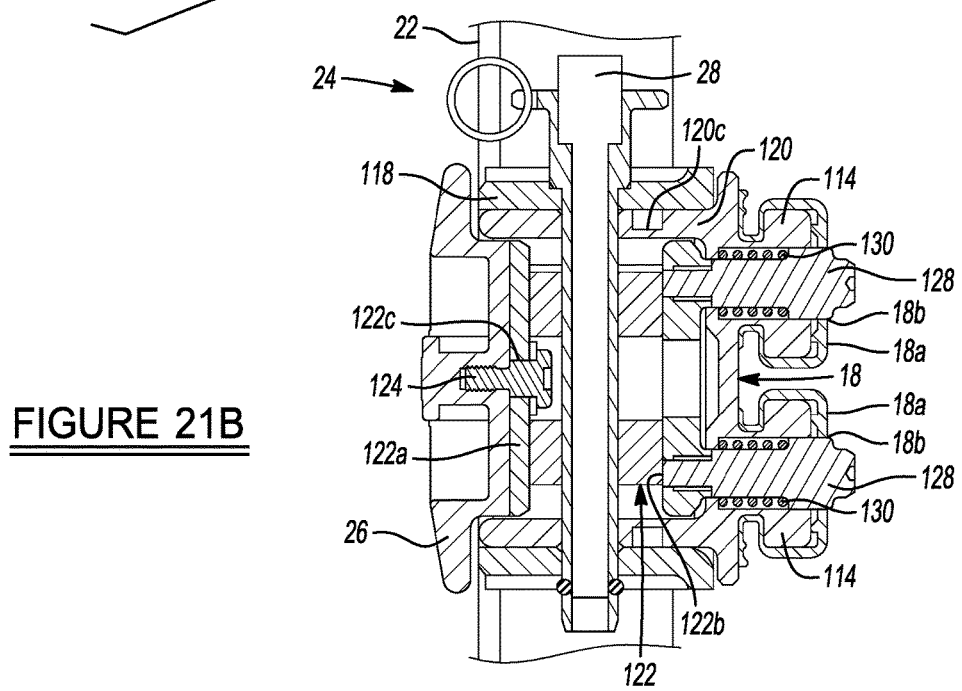
FIG. 21B is a cross-sectional side view of the assembled locking assembly of FIG. 21A.

Referring to FIGS. 21a and 21b, the locking assembly 24 is shown in greater detail. The mounting panel 22 includes a first portion 22a and a second portion 22b. Second portion 22b includes a pair of integrally formed foot portions 114 that engage within channels 18a and 18b of the track 18. The first portion 22a further includes the pair of sleeve section 52 that receive the tubular members 48 of the third frame section 46. Set screws (not shown) may be positioned in holes 52a in the sleeve sections 52 to secure the first portion 22a to the tubular sections 42.

With further reference to FIG. 21a, the first portion 22a of the mounting panel 22 includes a circumferential sleeve 118 that fits over a circumferential hub 120 on the second housing portion 22b and is able to rotate about the hub 120 when the locking pin 28 is removed from the locking assembly 24. Set screws 121a extend through holes 120b and into a circumferential channel 120c on the hub 120 to enable the sleeve 118 to be captured on the hub 120 but still allow the sleeve to rotate freely on the hub. The sleeve 118 includes a pair of aligned holes 118a for receiving the locking pin 28 therethrough. Likewise, the hub 120 on the second housing portion 22b includes first and second aligned pairs of holes 120a and 120b arranged 90 degrees from one another, which enable the first portion 22a to be secured in two orientations, 90 degrees rotationally spaced from one another, on the second housing portion 22b. When the locking pin 28 is inserted through aligned holes 118a and 120a, this places the articulating subsystem 16 in a vertical orientation, and when the locking pin 28 is inserted through aligned holes 118a and 120b, this places the articulating subsystem 16 in a horizontal orientation.

The locking assembly 24 further includes an actuating component 122 that is fixedly secured to the actuating element 26 via a threaded screw 124 which extends through a hole 122c in a wall 122a of the actuating component. The actuating component 122 includes four circumferentially spaced apart posts 126 that create perpendicular pathways for the locking pin 28 to pass through whether the articulating subsystem 16 is placed in its horizontal or vertical orientations. Locking track pins 128 are secured to a wall 122b of the actuating component 122 and are biased into the position shown in FIG. 21B by springs 130. This biasing force from the springs 130 exerts a continuous pulling force on the actuating element 26 that maintains it securely within the sleeve 118 of the first housing portion 22a. Pulling outwardly on the actuating element 26 retracts the locking track pins 128 against the biasing force of the springs 130 and enables the entire mounting panel 22 to be slid along the track 18.

Figure 22:
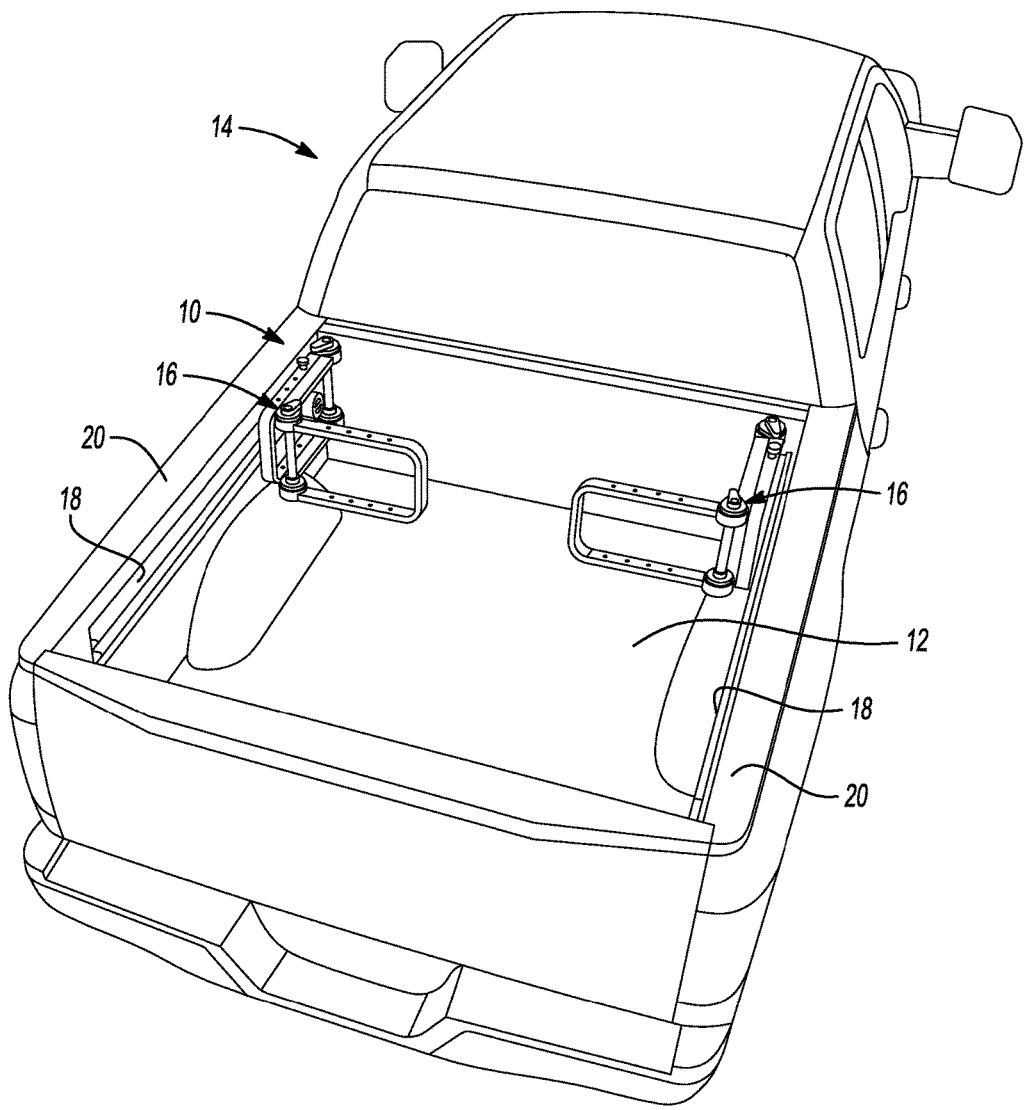
FIG. 22 is a perspective view showing the articulating subsystems configured to form a pair of cargo restraining walls in the truck bed.

FIG. 22 is shows the articulating subsystems 16 configured to form a pair of cargo restraining walls in the truck bed 12.

Figure 23:
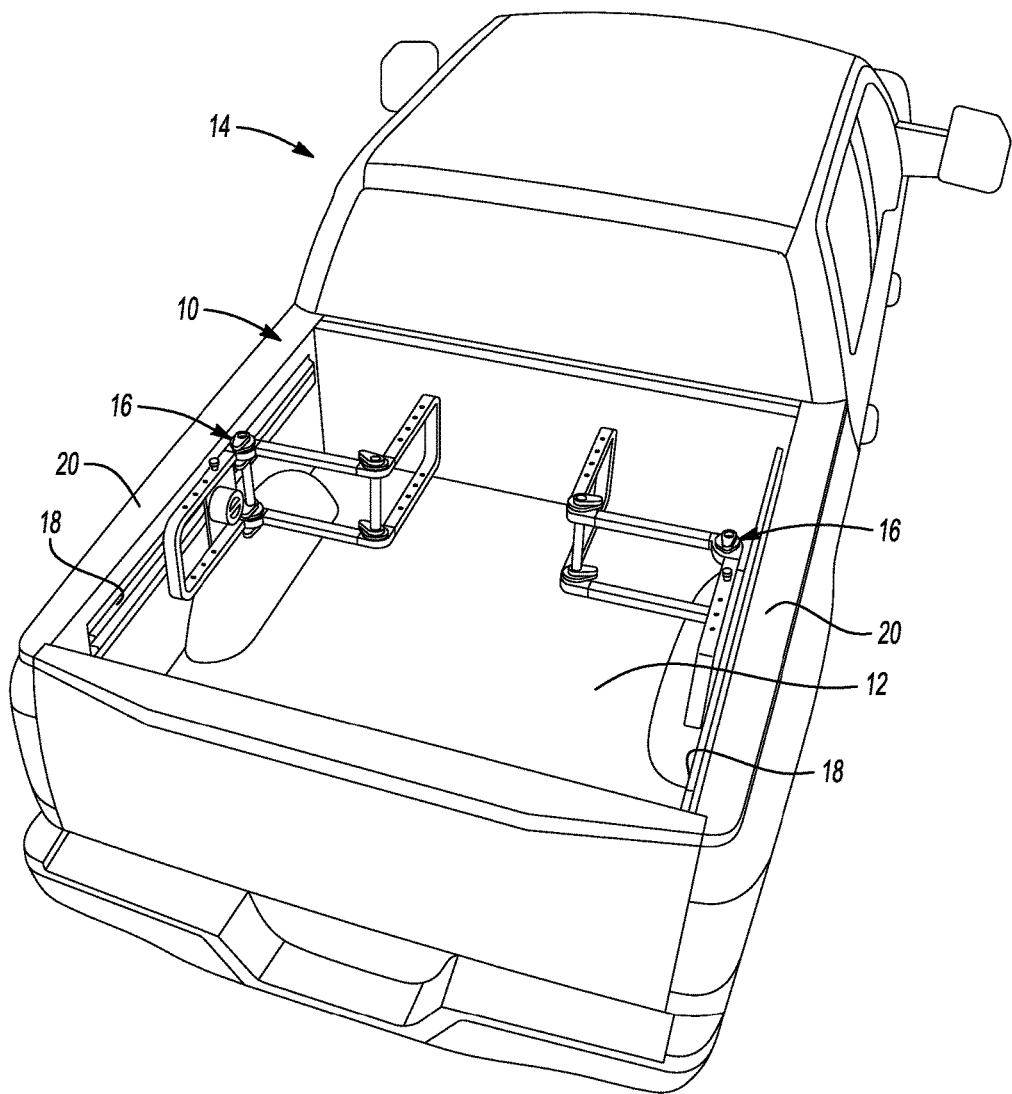
FIG. 23 is a perspective view showing the articulating subsystems configured to form cargo restraining compartments in the vehicle truck bed.

FIG. 23 shows the articulating subsystems 16 configured to form cargo restraining compartments in the vehicle truck bed 12.

Figure 24:
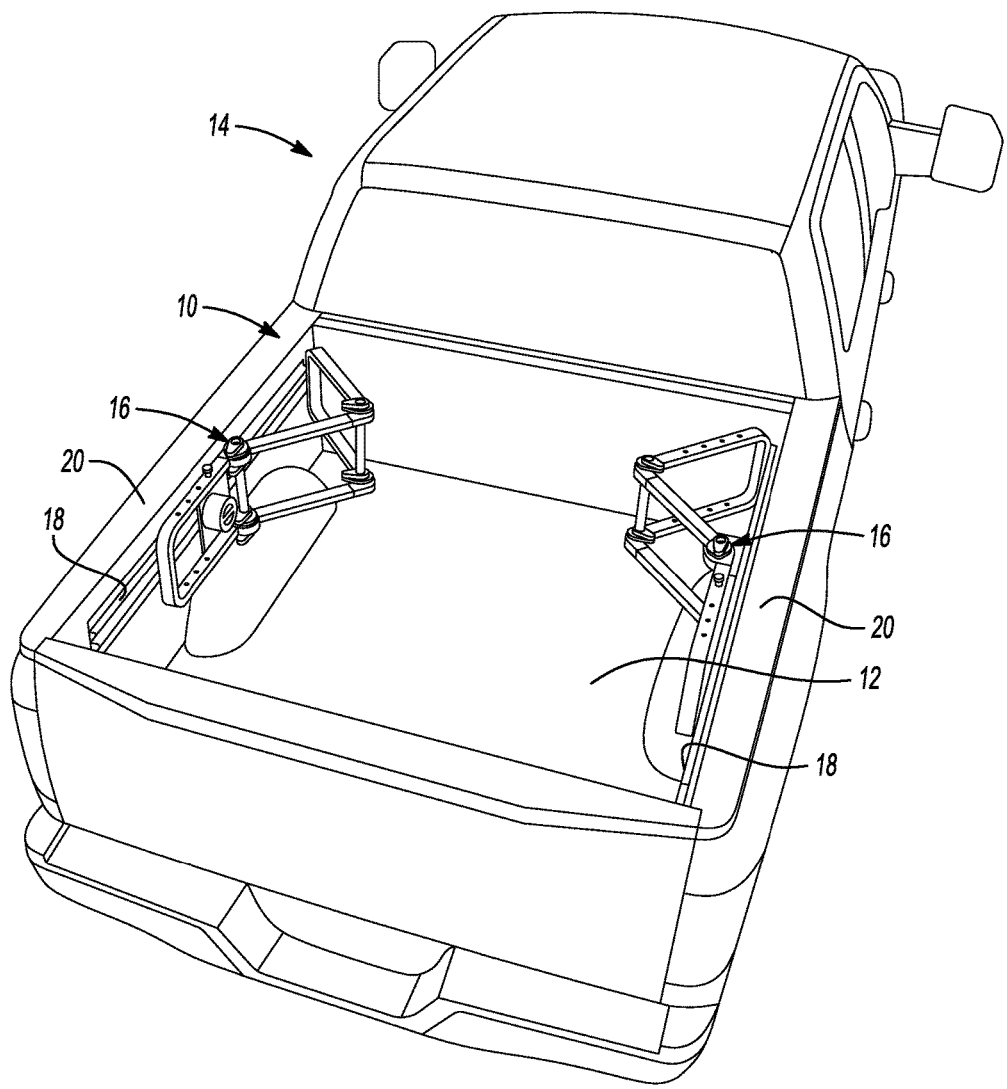
FIG. 24 is a perspective view showing the articulating subsystems configured in yet another configuration within the vehicle truck bed.

FIG. 24 shows the articulating subsystems 16 configured in yet another configuration within the vehicle truck bed 12.

Figure 25:
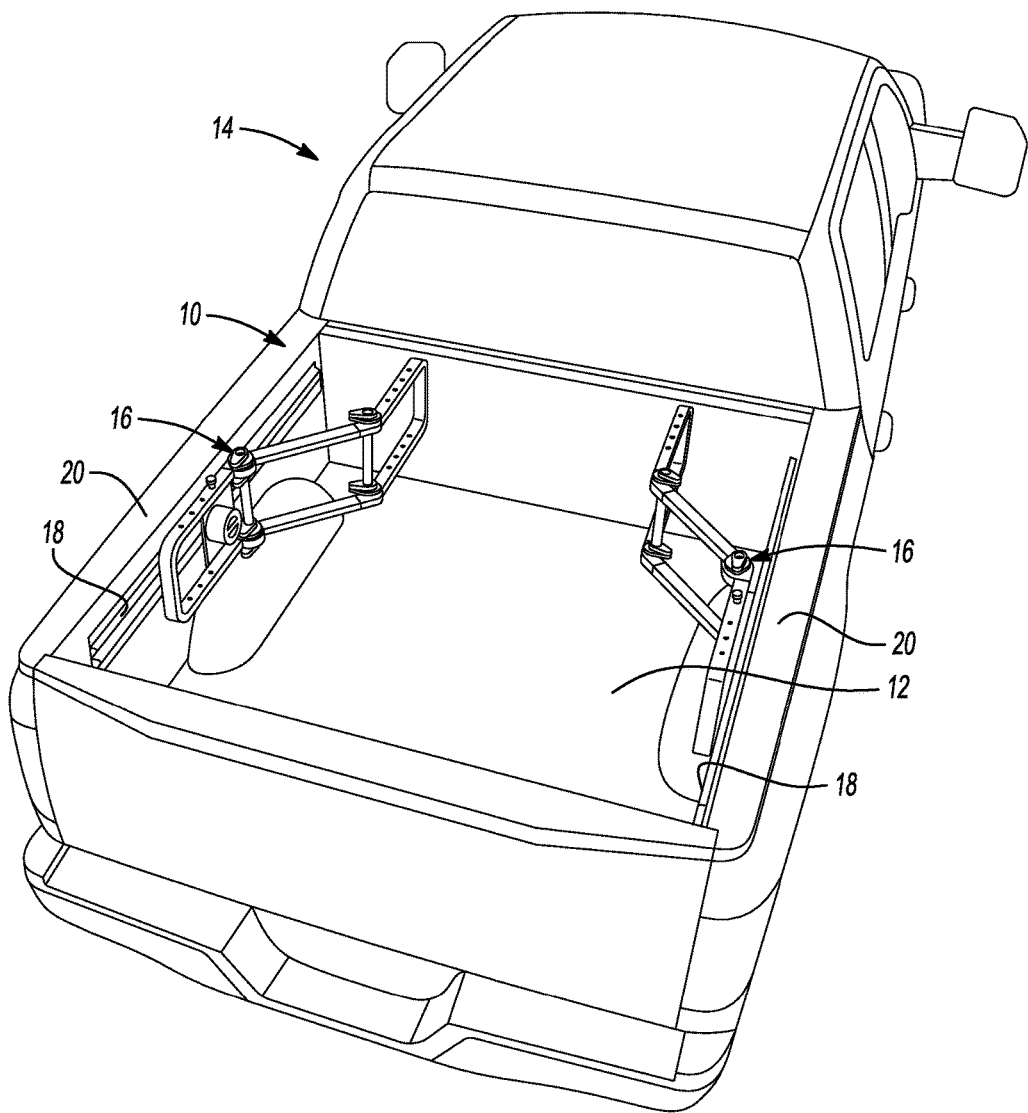
FIG. 25 is a perspective view showing the articulating subsystems in yet another article restraining configuration.

FIG. 25 shows the articulating subsystems 16 in yet another article restraining configuration in the vehicle truck bed 12.

Figure 26:
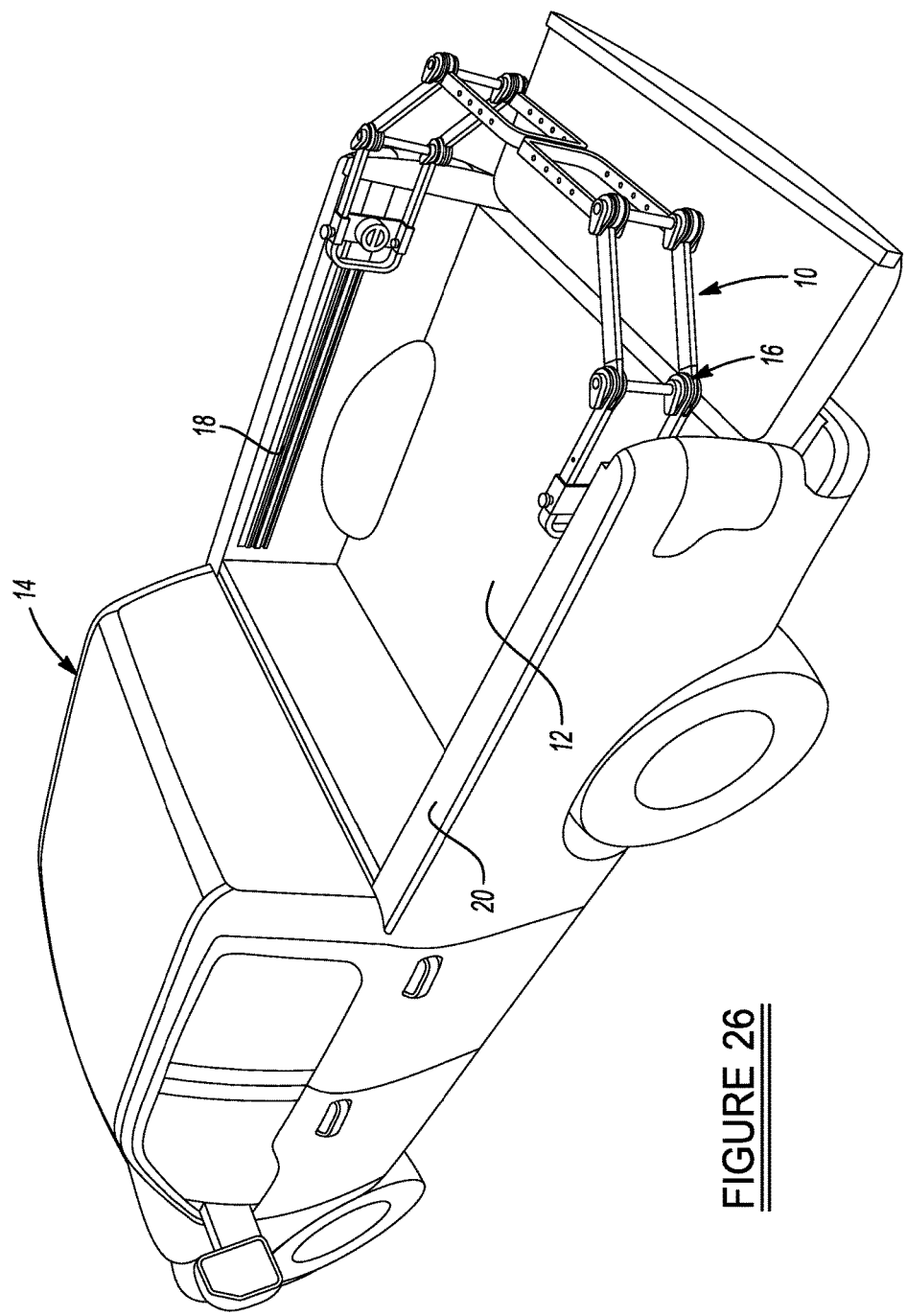
FIG. 26 is a perspective view showing the articulating subsystems being used to form a bed extender in the vehicle truck bed.

FIG. 26 shows the articulating subsystems 16 being used to form a bed extender in the vehicle truck bed 12.

Figure 27:
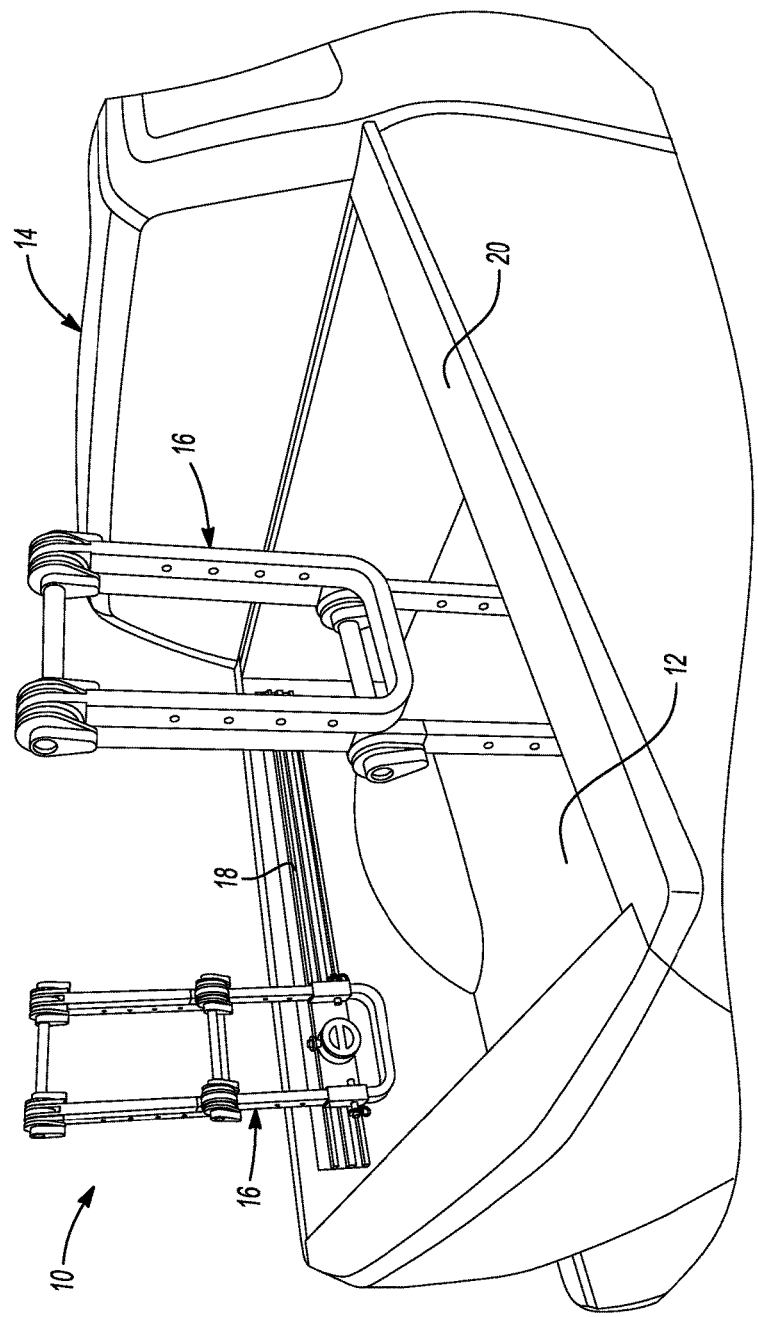
FIG. 27 is a perspective view showing the articulating subsystems being used to form elevated cargo restraining supports in the vehicle truck bed.

FIG. 27 shows the articulating subsystems 16 being used to form elevated cargo restraining supports in the vehicle truck bed.

FIG. 28 shows the articulating subsystems 16 being used to form elevated supporting structures. In this configuration articles such as clamp-on lights may be secured to the elevated portions of the articulating subsystems 16 to provide light to areas adjacent the vehicle, such as when changing a tire or performing other tasks in dimly lit conditions.

While the various figures have shown a pair of the articulating subsystems 16 being used in the truck bed 12, it will be appreciated that 1, 3, 4 or even more of the articulating subsystems 16 may be used. When in their stowed configurations, such as shown in FIGS. 1 and 2, the articulating subsystems 16 form lightweight, compact assemblies that can easily be removed from the tracks 18 and handled by a single individual without the need for any external tools or complex disassembly procedures. The overall thickness or depth of the articulating subsystems 16, when in their stowed positions, such as shown in FIG. 1, is preferably similar or just slightly less than a depth of each of the wheel well arches in the bed 12. This allows the articulating subsystems 16 to be carried on the tracks 18 in their stowed orientations without interfering with loading, unloading and carrying large flat items, such as sheets of plywood, that take up substantially the full width of the bed floor between the wheel well arches.

The ability to use the articulating subsystems 16 in either vertical or horizontal orientations, and to position each one independently at a desired longitudinal position along its respective track 18, further enhances the utility of the system 10 to accommodate a wide variety of article restraining and/or article supporting tasks. The articulating subsystems 16 may be configured to create multiple restraining "pockets" within the bed 12 for securing items such as propane cylinders, drums or other like cargo items that need to be transported in an upright position, and be restrained from tipping over and/or rolling around in the bed 12.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A cargo management system for use in a cargo area of a vehicle, the system including:
   a track secured to a wall of the cargo area of the vehicle;
   an articulating system secured to the track and adjustably positionable along the track so as to be securable at a plurality of positions along the track;
   the articulating system including:
      a mounting panel adapted to be secured to the track;
      at least a first frame section;
      a pair of first articulating hinge systems for supporting the first frame section for movement relative to the mounting panel; and
      the pair of first articulating hinge systems each having a first actuating element, the first actuating element of each one of said pair of first articulating hinge systems normally held in a locked orientation to hold the first frame section stationary;
      the pair of first actuating elements being configured to be movable into an unlocked position by a rotational force applied by a user to either one of the pair of first actuating elements, which enables each one of the first articulating hinge systems to be articulated simultaneously to permit the first frame section to be rotated relative to the mounting panel into a new orientation, and then held in the new orientation when either one of the pair of first actuating elements being engaged by the user is released by the user, thus causing both of the first actuating elements to be simultaneously moved back into the locked orientation.

2. The system of claim 1, wherein each one of the pair of first actuating elements comprises a rotatable lever.

3. The system of claim 1, wherein the mounting panel includes an actuating element configured to be manipulated by a user to an unlocked condition, wherein the articulating system is able to be moved along the track, and when released by the user, to be secured fixedly to the track.

4. The system of claim 1, wherein the mounting panel includes:
a circumferential sleeve;
a hub which engages the circumferential sleeve to permit rotation of the circumferential sleeve relative to the hub; and
a locking pin engageable with both the circumferential sleeve and the hub and being configured to hold the mounting panel in either one of first and second angular orientations.

5. The system of claim 4, wherein the first and second angular orientations comprise a horizontal orientation and a vertical orientation.

6. The system of claim 1, wherein the mounting panel includes foot portions configured to engage the track and to permit sliding motion of the mounting plate along the track.

7. The system of claim 1, further comprising:
a second frame section;
a second articulating hinge system for coupling the second frame section to the first frame section, and having a second actuating element to enable the second frame section moved into and locked in different angular orientations relative to the first frame section;
a third frame section;
a third articulating hinge system for coupling the second frame section to the third frame section, and including a third actuating element movable between unlocked and locked positions to enable the second frame section to be placed and held in different angular orientations relative to the third frame section.

8. The system of claim 7, wherein the mounting panel includes:
a pair of sleeve sections for receiving portions of the third frame section and enabling longitudinal positions of the third frame section relative to the mounting panel;
wherein the third frame sections each include a plurality of laterally aligned and longitudinally spaced holes; and
a pair of locking pins engageable with selected ones of the holes to secure the third frame section at a longitudinal position relative to the mounting panel.

9. The system of claim 1, wherein the first frame section comprises a generally U-shaped frame section having a connecting member, the first articulating hinge systems arranged at opposing ends of the connecting member and intercoupled.

10. A cargo management system for use in a cargo area of a vehicle, the system including:
a track secured to a wall of the cargo area of the vehicle;
an articulating system secured to the track and adjustably positionable along the track so as to be securable at a plurality of positions along the track;
the articulating system including:
a mounting panel adapted to be secured to the track;
at least a first frame section;
a first articulating hinge system for supporting the first frame section for movement relative to the mounting panel, and having a rotationally movable first actuating element;
a second frame section;
a second articulating hinge system for coupling the first and second frame sections for movement relative to each other, and having a rotationally movable second actuating element;
each of the first and second actuating elements held in a normally locked orientation to hold the first frame section stationary relative to the second frame section;
the first actuating element being configured to be movable into an unlocked position by a rotational force applied by a user, which enables the first frame section to be articulated freely relative to the second frame section, and then held in a new angular orientation when the first actuating element is released by the user; and
the second actuating element being configured to be movable into an unlocked position by rotational force applied by the user, which enables the second frame section to be articulated freely relative to the mounting panel while the second actuating element is being held in the unlocked position and then held in a new angular orientation when the second actuating element is released by the user.

11. The system of claim 10, wherein the mounting panel includes at least one foot portion and is slidably secured to the track.

12. The system of claim 10, further comprising a pair of the first articulating hinge systems, the pair of the first articulating hinge systems being coupled by a rod extending therebetween, and both ones of the pair of the first articulating hinge systems being simultaneously controlled so as to be movable into unlocked or locked positions by controlling the first actuating element of either one of the pair of the first articulating hinge systems.

13. The system of claim 10, further comprising a pair of the second articulating hinge systems, the pair of the second articulating hinge systems being coupled by a rod extending therebetween, and both ones of the pair of the second articulating hinge systems being simultaneously controlled so as to be movable into unlocked or locked positions by controlling the second actuating element of either one of the pair of the second articulating hinge systems.

14. The system of claim 10, wherein the mounting panel includes:
a circumferential sleeve;
a hub which engages the circumferential sleeve to permit rotation of the circumferential sleeve relative to the hub; and
a locking pin engageable with both the circumferential sleeve and the hub and being configured to hold the mounting panel in either one of first and second angular orientations.

15. The system of claim 14, wherein the mounting panel further includes a manually graspable user engageable actuating element configured to be movable by a user between locked and unlocked positions, which enables the mounting panel to be moved along the track when in the unlocked position, and to secure the mounting panel to the track when in the locked position.

16. The system of claim 10, wherein each of the first and second articulating hinge systems includes:

a first housing portion;
a second housing portion rotatable relative to the first housing portion; and
a plurality of locking pawls biased into radially outwardly positions relative to the first housing portion, thus placing its respective said articulating hinge system in a normally locked condition, and movable radially inwardly by movement of the respective said actuating element into the unlocked position, to enable rotational movement of its respective said articulating hinge system.

17. A cargo management system for use in a cargo area of a vehicle, the system including:
an articulating system adapted to be operatively supported from a wall of the cargo area;
the articulating system including:
a mounting panel adapted to be operatively secured to the wall;
at least a first frame section;
a pair of first articulating hinge systems for supporting the first frame section for movement relative to the mounting panel; and
the first articulating hinge systems each having a first actuating element, each one of the first actuating elements being normally held in a locked orientation to hold the first frame section stationary,
the first actuating elements being configured to be movable simultaneously into an unlocked position by a rotational force applied by a user to either one of the first actuating elements, which enables the first articulating hinge systems to be articulated simultaneously to permit the first frame section to be rotated relative to the mounting panel into a new orientation while the first actuating elements are both being held in the unlocked position, and then held stationary in the new orientation when the first actuating element being engaged by the user is released by the user, which causes both of the first actuating elements to be returned to their respective locked positions.

18. The system of claim 17, further comprising:
a second frame section; and
a second articulating hinge section configured to enable adjustable positioning of the first frame section relative to the second frame section.

19. The system of claim 17, wherein the mounting panel comprises:
a circumferential sleeve having a plurality of holes;
a hub which engages the circumferential sleeve to permit rotation of the circumferential sleeve relative to the hub, the hub having an additional plurality of holes wherein selective ones of the additional plurality of holes are able to be selectively aligned with the plurality of holes; and
a locking pin engageable with both the circumferential sleeve and the hub and being configured to hold the mounting panel in either one of first and second different angular orientations depending on which ones of the additional plurality of holes the locking pin is engaged with.

20. A cargo management system for use in a cargo area of a vehicle, the system including:
a track secured to a wall of the cargo area of the vehicle;
an articulating system secured to the track and adjustably positionable along the track so as to be securable at a plurality of positions along the track;
the articulating system including:
a mounting panel adapted to be secured to the track;
at least a first frame section;
a first articulating hinge system for supporting the first frame section for movement relative to the mounting panel;
the first articulating hinge system having a first actuating element, the first actuating element and the first articulating hinge system normally held in a locked orientation to hold the first frame section stationary;
the first actuating element being configured to be movable into an unlocked position by a rotational force applied by a user, which enables the first articulating hinge system to be articulated to permit the first frame section to be rotated relative to the mounting panel into a new orientation, and then held in the new orientation when the first actuating element is released by the user;
the mounting panel further including:
a circumferential sleeve;
a hub which engages the circumferential sleeve to permit rotation of the circumferential sleeve relative to the hub; and
a locking pin engageable with both the circumferential sleeve and the hub and being configured to hold the mounting panel in either one of first and second angular orientations.

* * * * *